United States Patent Office 2,730,541
Patented Jan. 10, 1956

2,730,541

PROCESS OF PREPARING ALKYL THIONO-PHOSPHATES

William T. Dye, Jr., Dayton, Ohio, assignor to Monsanto Chemical Company, St. Louis, Mo., a corporation of Delaware No Drawing. Application May 10, 1952,
Serial No. 287,251

12 Claims. (Cl. 260—461)

This invention relates to sulfur-containing organic compounds of phosphorus and more specifically provides an improved method for the preparation of trialkyl thionophosphates.

In the prior art, the thionophosphates have been generally prepared by condensation of a sodium alcoholate with thiophosphoryl chloride or a mono- or di-alkyl chlorothionophosphate, or by condensation of an alcohol with thiophosphoryl chloride or a mono- or di-alkyl chlorothionophosphate in the presence of a tertiary base such as pyridine. Since the reactions were conducted under substantially anhydrous conditions, the less expensive inorganic alkalis could not be used for neutralizing the hydrogen chloride. The use of large quantities of expensive organic bases, or of alkali alcoholates, did not recommend the prior methods for commercial manufacture of the trialkyl thionophosphates, which compounds form a useful class of insecticide intermediates.

Now I have found that the trialkyl thionophosphates may be prepared in good yields from readily available initial materials and without the wasteful consumption of organic bases by contacting a primary, fatty alcohol of from 1 to 5 carbon atoms wtih phosphorus trichloride in the presence of a refluxing solution of sulfur in an inert solvent, the reaction proceeding substantially according to the scheme:

$$PCl_3 + S + 3ROH \rightarrow (RO)_3PS + 3HCl$$

in which R is an alkyl radical of from 1 to 5 carbon atoms.

Alcohols which may be employed in the present process are primary, fatty alcohols of from 1 to 5 carbon atoms and include, e. g., methanol, ethanol, n-propanol, iso-propanol, n-butanol, isobutanol, n-pentanol, etc.

The above reaction is generally accompanied by the formation of a dialkyl chlorothionophosphate in low yields:

$$PCl_3 + S + 2ROH \rightarrow (RO)_2PSCl + 2HCl$$

The quantity of trialkyl thionophosphate formed far exceeds that of the dialkyl chlorothionophosphates so that even if the latter were not highly useful products the present process would be of economic advantage for the production of the trialkyl thionophosphates. However, the by-product dialkyl chlorothionophosphates, being valuable intermediates for the production of insecticides such as diethyl 4-nitrophenyl thionophosphate ("Parathion") may be readily disposed of. Also, if maximum production of the trialkyl thionophosphates is desired, the dialkyl by-product in the crude reaction mixture may be readily converted to the trialkyl compound by reacting it with additional alcohol in the presence of a small amount of an alkali metal alkoxide or an organic base such as pyridine, which as pointed out above, are necessarily employed in preparing the trialkyl thionophosphates from the dialkyl chlorothionophosphates.

The preferential formation of the trialkyl thionophosphates from phosphorus trichloride, sulfur and alcohol is surprising. The reactant system is very complex and the course of the reaction cannot be positively defined. The following discussion seems, however, to be a logical explanation of the results. It is known that the trialkyl phosphites, believed to be intermediates in the present preparation, react very readily with hydrogen chloride to yield dialkyl phosphites, according to the equation $$(RO)_3P + HCl \rightarrow (RO)_2POH + RCl$$

In the copending application, Serial No. 122,584, of Paul L. Gann and Rudolf L. Heider, filed October 20, 1949, now Patent No. 2,692,890, and assigned to the same assignee as is the present application, the above reaction is carried out under conditions nearly identical to those of the present invention, i. e., in refluxing hexane, with resulting high yields of dialkyl phosphites. The present invention, therefore, appears to constitute, primarily, a novel method for promoting the reaction $$(RO)_3P + S \rightarrow (RO)_3PS$$

in preference to the reaction which yields a dialkyl phosphite. The unexpected success of the method probably is the result of its capacity for maintaining a low concentration of hydrogen chloride and a high concentration of sulfur in the reaction zone. An optimum solvent for the reaction mixture, therefore, is one which is a poor solvent for hydrogen chloride and a good one for sulfur. The yield of by-product dialkyl phosphite is thereby reduced to a minimum. The dialkyl thionophosphoryl chlorides observed as by-products probably arise from the reaction $$(RO)_2PCl + S \rightarrow (RO)_2PSCl$$

While the formation of some quantities of both the trialkyl thionophosphates and the dialkyl chlorothionophosphates occurs irrespective of reactant proportions, for good yields it is preferred to employ the reactants in substantially stoichiometric proportions. Preferably an excess of the sulfur is used, and it is not necessary that all the sulfur be in solution. In order to maintain a high concentration of sulfur and to avoid a high concentration of hydrogen chloride in the reaction zone, I prefer to operate in the presence of a refluxing inert diluent which is a good solvent for sulfur and a poor solvent for hydrogen chloride. Such diluents are preferably aromatic hydrocarbon solvents such as benzene, toluene or xylene. Highly chlorinated liquid hydrocarbons such as carbon tetrachloride or hexachloroethane, and aliphatic hydrocarbons such as hexane are less effective, but moderately successful, solvents. Other solvents not specified here, which have the desirable properties of high sulfur and low hydrogen chloride solubility are conceived to be within the scope of the present invention. The process need not be carried out at reflux if the desired solubility characteristics may otherwise be achieved, though, in general, the reflux point is the most generally effective. While no advantages are known to offset its higher cost, phosphorus tribromide, instead of phosphorus trichloride, may be used in the present process.

I have also found that in order to suppress the formation of undesirable by-products such as the dialkyl phosphites, it is advantageous to introduce the alcohol gradually into a reaction vessel which may contain the refluxing solution of diluent, sulfur and phosphorus trichloride, or to feed both the phosphorus trichloride and the alcohol concurrently into the refluxing mixture of sulfur and solvent. The reaction may also be carried out in a continuous manner. To minimize contact of the alcohol with hydrogen chloride, it is advantageous to introduce the alcohol below the surface of the reaction mixture, i. e., below the level of the liquid in the reaction vessel. Foaming may be suppressed, if necssary, by judicious use of diluents; for example, in my experiments I have found that much less foaming is encountered in reactions conducted in benzene containing a little hexane than in benzene alone.

The temperature employed depends upon the nature of the alcohol used as well as upon the quantities of reactants used, and is generally from, say, 50° C. to the refluxing temperature of the reaction mixture. Heating is generally discontinued as soon as all of the reactants have been introduced into the reaction zone. The reaction mixture is then allowed to cool, and the trialkyl thionophosphate may be recovered therefrom, if desired, by fractional distillation. The entire reaction mixture may be used for special purposes; generally however, it is desirable to remove the excess sulfur by filtration of the cooled reaction mixture. Inasmuch as the by-product dialkyl chlorothionophosphate is at present of commercial importance, it is generally advisable to fractionate the reaction mixture.

The present process may be conducted batch-wise or by a continuous manner, whereby the product is removed from the reaction zone as the reactants are introduced into it. In the continuous process the alcohol and the phosphorus chloride may be introduced concurrently or alternately into the heated mixture of diluent and sulfur, while removing the products therefrom.

The invention is further illustrated, but not limited, by the following examples.

*Example 1*

A mixture of 400 cc. of benzene, 1.0 atom (32 g.) of sulfur, and 1.0 mole (137.3 g.) of phosphorus trichloride was placed in a 1-liter flask and heated to reflux. All of the sulfur dissolved. The addition of a solution of 3 moles (138 g.) of absolute ethanol in 300 cc. of benzene was begun. The mixture foamed so badly that addition was only dropwise, and therefore very slow. The addition of alcohol was completed in 2.5 hours. The mixture was then cooled in an ice bath; no precipitation of sulfur occurred. Distillation through a 30" Vigreux column yielded the following fractions:

B. P. 79–91° C./14 mm., 3 g., $n_D^{25}$ 1.4662, largely (EtO)$_2$PSCl
B. P. 91–96° C./14 mm., 19 g., $n_D^{25}$ 1.4520, (EtO)$_2$PSCl and (EtO)$_3$PS
B. P. 96° C./14 mm., 18 g., $n_D^{25}$ 1.4486, (EtO)$_3$PS
B. P. 96–100° C./14 mm., 40 g., $n_D^{25}$ 1.4458, (EtO)$_3$PS The refractive indices and boiling points of the various fractions indicate that the product consisted largely of triethyl thionophosphate, with a small content of diethyl thionophosphoryl chloride, and no detected diethyl phosphite.

*Example 2*

A solution of 1.0 mole of phosphorus trichloride, 1.5 mole of sulfur, 750 cc. of benzene, and 50 cc. of hexane was heated to reflux. Absolute ethanol (3 moles) was run in, below the surface of the liquid, during 30 minutes. There was no trouble with foaming. The mixture was cooled in ice, and sulfur was filtered off. The solution was washed once with water and once with enough dilute sodium carbonate to render it slightly alkaline, dried by filtration, and freed of solvent under vacuum. On cooling, the solution deposited more sulfur, which was again filtered. The filtrate was distilled through an 8" Vigreux column to obtain 99 g. of distillate consisting largely of triethyl thionophosphate.

*Example 3*

A solution of 400 cc. of toluene, 1.0 mole of sulfur, and 1.0 mole of phosphorus trichloride was placed in a 1-liter flask and heated to reflux. A solution of 3.0 moles of ethanol in 200 cc. of toluene was added during 45 minutes. Nearly all of the alcohol went in before hydrogen chloride evolution slowed appreciably. Sulfur was totally in solution throughout the run. The mixture deposited 5 g. of sulfur on standing. This was filtered off, and the filtrate was washed with a little sodium carbonate solution. There was very little free acidity and no evidence of latent acidity. The liquid was washed once with water, filtered through a few layers of filter paper to remove visible water, and distilled through a 30" Vigreux column, rapidly at first and slowly after removal of solvent. Fractionation was rather incomplete. The total weight of distillate was 110 g., of which an estimated 70–80 per cent was triethyl thionophosphate.

*Example 4*

This example is like Example 3, except that the alcohol was introduced below the level of the liquid in the flask, to minimize contact with hydrogen chloride, and at a considerably slower rate. A solution of 500 cc. of toluene, 1.0 mole of sulfur, and 1.0 mole of phosphorus trichloride was heated to reflux at about 90° C. To the solution was added a solution of 3 moles of ethanol in 100 cc. of toluene, during a period of 2.5 hours. The mixture was then cooled to room temperature, washed with water and sodium carbonate solution, filtered to remove visible water, and distilled under vacuum. After removal of solvent was complete, the remainder was distilled through a 30" Vigreux column. Of the distillate, the first three fractions, B. P. 66–80° C./12 mm., weighing 22 g., had refractive indices $n_D^{25}$ 1.4593, 1.4348, and 1.4430, suggesting mixtures of diethyl thionophosphoryl chloride with small amounts of diethyl phosphite. The next two fractions, weighing 35 g., had indices near 1.4540, and apparently consisted of approximately equal quantities of diethyl thionophosphoryl chloride and triethyl thionophosphate. The remaining distillate, 76 g., consisted mostly of triethyl thionophosphate.

*Example 5*

This preparation employed an intermittent feed of the reactants and was directed especially toward diethyl thionophosphoryl chloride.

A solution of 400 cc. of toluene and 1.5 mole of sulfur (excess to insure a high concentration throughout the run) was placed in a 1-liter flask and heated to 100° C. A reflux condenser, stirrer, thermometer, and two graduated dropping funnels were attached. The funnel for alcohol had a tip which entered the reaction mixture below its surface, in order to avoid contact with hydrogen chloride in the gaseous phase. A mole of phosphorus trichloride was diluted to 125 cc. with toluene and placed in one funnel. A solution of 2 moles of ethanol diluted to 250 cc. with toluene was placed in the other funnel. The phosphorus trichloride solution was added in 10 cc. portions, each one followed by 20 cc. portions of the ethanol solution, at a rate which maintained vigorous refluxing at 100° C. The addition required 2 hours. At the end of this addition, another mole of ethanol was added, with hydrogen chloride continuing to evolve virtually to the end of the addition. The mixture was cooled at room temperature, left overnight, and filtered to remove 13 g. of sulfur. The filtrate was washed with water and then with sodium carbonate solution until neutral, and filtered through several layers of paper to remove visible water. Toluene was removed at 400 mm., and the remainder of the material was distilled through an 8" Vigreux column. A total of 161 g. of distillate was obtained, B. P. 63–105° C./18 mm. This was redistilled through a 36" helix-filled column, with a high reflux ratio. Ninety grams of triethyl thionophosphate and thirty-seven grams of diethyl chlorothionophosphate were thus obtained.

What I claim is:

1. The process which comprises contacting phosphorus trichloride with a primary, fatty alcohol of from 1 to 5 carbon atoms in the presence of a heated solution of sulfur in an inert diluent which is a solvent for said sulfur and substantially a non-solvent for hydrogen chloride and recovering from the resulting reaction product a trialkyl thionophosphate in which each alkyl radical has from 1 to 5 carbon atoms.

2. The process which comprises contacting together phosphorus trichloride with a primary, fatty alcohol of from 1 to 5 carbon atoms in the presence of a heated solution of sulfur in an inert diluent which is a solvent for said sulfur and substantially a non-solvent for hydrogen chloride and recovering from the resulting reaction product a trialkyl thionophosphate in which each alkyl radical has from 1 to 5 carbon atoms and a dialkyl chlorothionophosphate in which each alkyl radical has from 1 to 5 carbon atoms.

3. The process which comprises contacting phosphorus trichloride with a primary, fatty alcohol of from 1 to 5 carbon atoms in the presence of a refluxing solution of sulfur in an inert diluent which is a solvent for said sulfur and substantially an non-solvent for hydrogen chloride and recovering from the resulting reaction product a trialkyl thionophosphate in which each alkyl radical has from 1 to 5 carbon atoms.

4. The process which comprises contacting phosphorus trichloride with a primary, fatty alcohol of from 1 to 5 carbon atoms in the presence of a refluxing solution of sulfur in an inert diluent which is a solvent for said sulfur and substantially a non-solvent for hydrogen chloride and recovering from the resulting reaction product a trialkyl thionophosphate in which each alkyl radical has from 1 to 5 carbon atoms and a dialkyl chlorothionophosphate in which each alkyl radical has from 1 to 5 carbon atoms.

5. The process which comprises gradually adding a primary, fatty alcohol of from 1 to 5 carbon atoms to a mixture of phosphorus trichloride and sulfur in a heated, inert liquid which is a solvent for said sulfur and substantially a non-solvent for hydrogen chloride, and recovering from the resulting reaction product a trialkyl thionophosphate in which each alkyl radical has from 1 to 5 carbon atoms.

6. The process which comprises gradually adding a primary, fatty alcohol of from 1 to 5 carbon atoms to a mixture of phosphorus trichloride and sulfur in a heated, inert liquid which is a solvent for said sulfur and substantially a non-solvent for hydrogen chloride, and recovering from the resulting reaction product a trialkyl thionophosphate in which each alkyl radical has from 1 to 5 carbon atoms and a dialkyl chlorothionophosphate in which each alkyl radical has from 1 to 5 carbon atoms.

7. The process which comprises gradually adding ethanol to a mixture of phosphorus trichloride and sulfur in a refluxing, inert liquid which is a solvent for said sulfur and substantially a non-solvent for hydrogen chloride, and recovering triethyl thionophosphate from the resulting reaction product.

8. The process which comprises gradually adding ethanol to a mixture of phosphorus trichloride and sulfur in a refluxing, inert liquid which is a solvent for said sulfur and substantially a non-solvent for hydrogen chloride and recovering triethyl thionophosphate and diethyl chlorothionophosphate from the resulting reaction product.

9. The process which comprises continuously introducing a primary, fatty alcohol of from 1 to 5 carbon atoms and phosphorus trichloride into a reaction vessel containing a heated solution of sulfur in an inert liquid which is a solvent for said sulfur and substantially a non-solvent for hydrogen chloride while removing from said vessel a trialkyl thionophosphate in which each alkyl radical has from 1 to 5 carbon atoms.

10. The process which comprises continuously introducing a primary, fatty alcohol of from 1 to 5 carbon atoms and phosphorus trichloride into a reaction vessel containing a heated solution of sulfur and an inert liquid which is a solvent for said sulfur and substantially a non-solvent for hydrogen chloride while removing from said reaction vessel a trialkyl thionophosphate in which each alkyl radical has from 1 to 5 carbon atoms and a dialkylchlorothionophosphate in which each alkyl radical has from 1 to 5 carbon atoms.

11. The process which comprises adding alternately phosphorus trichloride and a primary, fatty alcohol to a heated solution of sulfur in an inert liquid which is a solvent for said sulfur and substantially a non-solvent for hydrogen chloride and recovering from the resulting reaction product a trialkyl thionophosphate in which each alkyl radical has from 1 to 5 carbon atoms.

12. The process which comprises adding alternately phosphorus trichloride and a primary, fatty alcohol to a heated solution of sulfur in an inert liquid which is a solvent for said sulfur and substantially a non-solvent for hydrogen chloride and recovering from the resulting reaction product a trialkyl thionophosphate in which each alkyl radical has from 1 to 5 carbon atoms and a dialkyl chlorothionophosphate in which each alkyl radical has from 1 to 5 carbon atoms.

References Cited in the file of this patent

UNITED STATES PATENTS

| Number | Name | Date |
|---|---|---|
| 2,250,049 | Moyle | July 22, 1941 |
| 2,260,305 | Engelke | Oct. 28, 1941 |
| 2,506,344 | Cleary | May 2, 1950 |
| 2,536,647 | Kosolapoff | Jan. 2, 1951 |